UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

YELLOW-RED DYE AND PROCESS OF MAKING SAME.

No. 841,003.      Specification of Letters Patent.      Patented Jan. 8, 1907.

Application filed May 11, 1906. Serial No. 316,309.

*To all whom it may concern:*

Be it known that I, GADIENT ENGI, chemist, a citizen of the Swiss Republic, and a resident of Basel, Switzerland, have invented a new and useful Yellow-Red Dye and Process of Making Same, of which the following is a full, clear, and exact specification.

In my application for Letters Patent, Serial No. 307,409, of March 22, 1906, I have described the manufacture of a bluish-red dyestuff, dyeing in the vat like indigo, by heating salicylthioacetic acid,

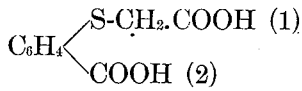

in presence of aromatic nitro-hydrocarbons—such as, for example, nitrobenzene—at high temperatures. The dyestuff thus obtained dyes cotton without a mordant in an alkaline hydrosulfite vat bluish-red clear tints.

I have now found that dyestuffs of the same character, but dyeing yellower-red tints, may be obtained by heating salicylthioacetic acid with a nitro-hydrocarbon and an isatin compound—as, for example, isatin, its homologues, and its substitution products. When the mass produced by the reaction is cooled, the new dyestuffs crystallize in the form of brilliant yellowish-red to brownish-red well-formed needles.

The following examples illustrate the manufacture:

Example I: A mixture of ten parts of salicylthioacetic acid and seven parts of isatin is introduced into about sixty parts of nitrobenzene, and the whole is heated for two to three hours in an oil-bath at 225° to 230° centigrade, (temperature of the bath.) On cooling the new dyestuff crystallizes from the dark yellowish-red solution thus obtained as small slender yellowish-red crystals, which are separated by filtration, washed with alcohol, and dried. The dyestuff has the following properties: In concentrated sulfuric acid it dissolves in the cold to a dirty-brown solution. By addition of water to this solution the unchanged dyestuff is precipitated in the form of yellowish-red flocks. By heating the dyestuff with concentrated sulfuric acid or feebly-fuming sulfuric acid a beautiful violetish-red solution is obtained which changes to a clear brownish red on addition of water without precipitation of the original dyestuff. The diluted sulfuric-acid solution of the dyestuff, which evidently contains a sulfonic acid of the dyestuff, dyes wool yellowish-red tints. In the cold the dyestuff is insoluble in alcohol. It dissolves very difficultly in hot alcohol to a clear rose-colored solution. It dissolves equally difficultly in hot benzene and in hot chloroform, yielding bluish-red solutions having yellowish-red fluorescence. Anilin and nitrobenzene dissolve it easily when heated; but it separates completely on cooling in the form of brilliant needles. With diluted caustic soda and hydrosulfite it forms a solution of a leuco derivative in which cotton may be dyed without a mordant, in the manner of indigo, clear yellowish-red tints characterized by their fastness.

Example II: A mixture of twelve parts of salicylthioacetic acid, five parts of isatin chlorid, and eighty to one hundred parts of nitrobenzene is heated in an oil-bath in a vessel provided with a reflux condenser for two to three hours, so that it boils gently. When the mass cools, the product of the reaction separates as brilliant interlacing brownish-red needles. By filtering these needles and washing them with alcohol they are obtained directly in a pure condition. The dyestuff thus made behaves with respect to organic solvents and to concentrated sulfuric acid analogously to the dyestuff prepared according to Example I.

With caustic soda and hydrosulfite the dyestuff yields a solution of a leuco derivative capable of dyeing cotton without a mordant in a vat, after the manner of indigo, red tints that are much yellower than those obtained with the dyestuff described in my application for Letters Patent, Serial No. 307,413, of March 22, 1906.

The procedure is analogous if the homologues of isatin or its other substitution products be used instead of isatin.

What I claim is—
1. The described process for the manufacture of yellowish-red vat-dyeing dyestuffs by heating salicylthioacetic acid

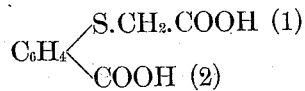

at a high temperature with an aromatic nitrohydrocarbon and an isatin compound.

2. As a new article of manufacture, the herein-described yellowish-red, vat-dyeing dyestuff, insoluble in cold alcohol, difficultly soluble in hot benzene, and hot chloroform with bluish-red coloration and yellowish-red fluorescence, difficultly soluble in hot alcohol with a clear rose coloration, soluble in anilin and nitrobenzene when heated, soluble in cold concentrated sulfuric acid with a dirty-brown coloration and in hot concentrated sulfuric acid with a beautiful violet-red coloration turning to clear brownish red on addition of water.

In witness whereof I have hereunto signed my name, this 1st day of May, 1906, in the presence of two subscribing witnesses.

GADIENT ENGI.

Witnesses:
    GEO. GIFFORD,
    OMAND RITTER.